United States Patent
Kunze et al.

(10) Patent No.: US 7,017,168 B2
(45) Date of Patent: Mar. 21, 2006

(54) INFORMATION PLATE HANDLING IN A READ/WRITE DEVICE

(75) Inventors: Norbert Kunze, Diez (DE); Stefan Müller, Wetzlar (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 53 days.

(21) Appl. No.: 11/040,056

(22) Filed: Jan. 21, 2005

(65) Prior Publication Data

US 2005/0132391 A1  Jun. 16, 2005

Related U.S. Application Data

(62) Division of application No. 09/674,670, filed as application No. PCT/EP00/02213 on Mar. 10, 2000, now Pat. No. 6,883,174.

(30) Foreign Application Priority Data

Mar. 11, 1999 (DE) .................. 199 10 668

(51) Int. Cl.
*G11B 17/04* (2006.01)
(52) U.S. Cl. ..................................... 720/626
(58) Field of Classification Search .............. 720/626, 720/645
See application file for complete search history.

(56) References Cited

U.S. PATENT DOCUMENTS

| | | | | |
|---|---|---|---|---|
| 3,695,741 A | * | 10/1972 | Dollenmayer | 312/8.12 |
| 4,833,666 A | * | 5/1989 | Gijzen et al. | 369/75.2 |
| 5,010,540 A | * | 4/1991 | Fuji et al. | 369/47.4 |
| 5,416,763 A | * | 5/1995 | Ohsaki | 369/77.1 |
| 5,544,148 A | * | 8/1996 | Nakamichi | 369/30.82 |
| 5,673,240 A | * | 9/1997 | Kawasaki | 369/44.28 |
| 5,828,641 A | * | 10/1998 | Abe et al. | 720/645 |
| 6,256,280 B1 | * | 7/2001 | Sakurai et al. | 369/77.1 |
| 6,288,982 B1 | * | 9/2001 | Kato | 369/30.36 |
| 6,338,974 B1 | * | 1/2002 | Strnad | 438/16 |
| 6,396,796 B1 | * | 5/2002 | Kletzl | 720/615 |
| 6,633,517 B1 | * | 10/2003 | Nakamichi | 369/30.78 |

FOREIGN PATENT DOCUMENTS

| | | | |
|---|---|---|---|
| DE | 19854922 A1 | * | 6/1999 |
| EP | 00742558 A2 | * | 11/1996 |
| EP | 00944073 A1 | * | 9/1999 |

* cited by examiner

Primary Examiner—David Davis
(74) Attorney, Agent, or Firm—Steven R. Petersen

(57) ABSTRACT

Handling an information plate includes receiving the information plate at a roller element, the information plate rolling over the roller element; detecting a position of the information plate using a scanning lever, the scanning lever having a scanning edge pressed against an edge of the information plate; driving a transport wheel into rotation based on the detected position of the information plate; exerting a tangential force on the edge of the information plate using the transport wheel; and transporting the information plate into a loading device, the information plate supported by the transport wheel and the roller element.

7 Claims, 1 Drawing Sheet

INFORMATION PLATE HANDLING IN A READ/WRITE DEVICE

CROSS-REFERENCE TO RELATED APPLICATIONS

This application is a division of U.S. application Ser. No. 09/674,670 filed Nov. 2, 2000, now U.S. Pat. No. 6,883,174, and the benefit of the filing date of that application is claimed which is 371 of PCT/EP00/02213 filed on Mar. 10, 2000.

BACKGROUND OF THE INVENTION

The invention relates to a device for reading information stored on an information plate and/or writing information on an information plate, comprising a loading mechanism for loading and unloading the information plate.

The term information plate is understood to refer to disc-shaped data carriers such as, for example, CDs, CD-ROMs, and DVDs.

Such a device is known, for example, from U.S. Pat. No. 6,463,025 B1.

Information plate transport processes inside the device are necessary if the information plates are to be played or stored in a stacking unit. It is necessary in particular that the information plate can be taken from an ejection position, in which the information plate can be taken from the device by a user, into a playback unit of the device. Furthermore, the transport to a stacking unit designed for storing the information plates is necessary in changer devices.

SUMMARY OF THE INVENTION

It is an object of the invention to provide a device of the kind mentioned in the opening paragraph which renders possible a reliable monitoring and control of the transport of the information plate, in particular during loading and unloading.

According to the invention, this object is achieved in that the device comprises at least one movable scanning lever for detecting the position of the information plate, which lever is designed to contact the plate edge of the information plate, and in that a position sensor is provided for supplying position information on the position of the information plate in dependence on the position of the scanning lever.

It is possible by means of the scanning lever to recognize the position of the information plate electrically throughout the transport of the information plate. This renders possible an optimized monitoring and control of the loading and unloading process as well as of other transport processes of the information plate, thus increasing the functional reliability of the device. Preferably, the scanning lever can be pressed by spring force against the plate edge of the information plate. It bears at least partly on the plate edge of the information plate during the loading and/or unloading process and changes its position during this. This is detected by the position sensor and can be transmitted as position information to a control unit designed for controlling the loading process. In particular, the position information may be utilized for supplying a start and a stop signal for starting and stopping the loading process.

Variable resistors and electronic encoder switches are particularly simple, inexpensive, and reliable position sensors.

An advantageous embodiment of the invention renders it possible in a simple manner to make the information plate enter the loading mechanism again, if so desired by the user, immediately after an ejection process has ended, without the necessity of removing the information plate first completely from the device. This is often referred to as the push-back function. It is necessary here to generate a trigger signal for the drive motor of the transport gear for starting the loading process. This is preferably done by means of a slight inward push given by the user in the loading direction of the information plate. The roller element is rotated somewhat during this pushing movement.

The prestress of the roller element may be designed to be very small and may be realized, for example, by means of a torsion spring. Accordingly, the user need exert only a very slight force for rotating the roller element against its prestress by pushing against the information plate and thus realizing the required insertion path for generating the trigger signal which starts the loading process. The information plate is inserted in the loading direction, rolling over the roller element, whereby the scanning lever which scans the position of the information plate is deflected. This causes the position sensor to change its code or its resistance, as applicable, and generates the trigger signal for controlling the drive motor of the transport wheel. The pivoting arms are preferably prestressed relative to one another with great prestress forces. The device accordingly has the advantage that the user need not insert the information plate into the device against the comparatively great prestress forces which act between the pivot arms for starting the loading process of the information plate, but only against the substantially smaller prestress force with which the roller element is biased.

An embodiment of the invention is diagrammatically depicted in the sole Figure of the drawing and will be explained in more detail below.

BRIEF DESCRIPTION OF THE DRAWING

The sole FIGURE is a plan view of the loading mechanism of a device for reading information stored on information plates and/or writing information on information plates, where an information plate 1 is in an ejection position in which it can be taken from the device.

DETAILED DESCRIPTION OF THE PREFERRED EMBODIMENT

Figure 1:
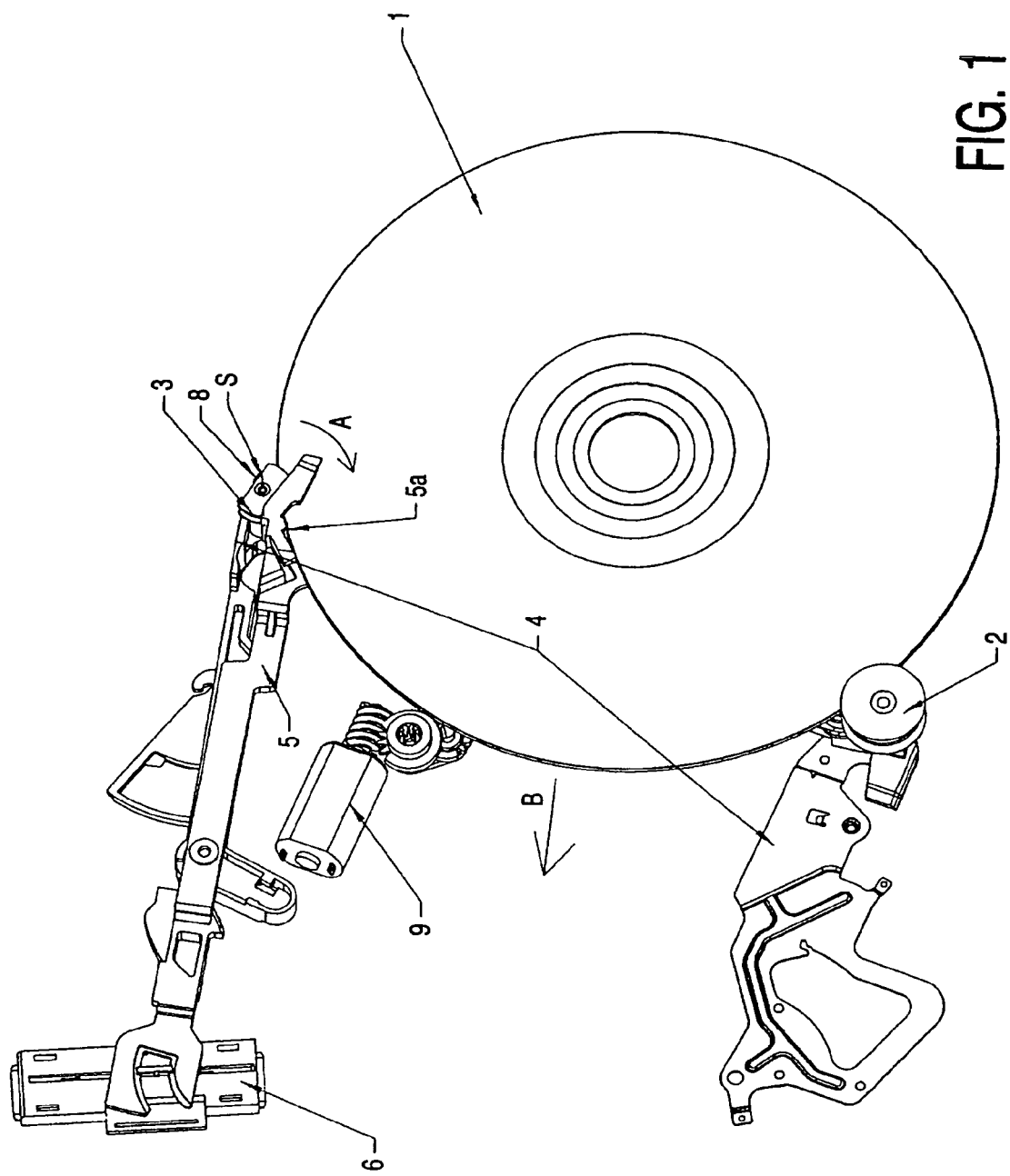

The loading mechanism comprises a transport wheel 2 which can be driven into rotation about an axis of rotation 2a and which is fastened on a first pivoting lever 4a. The pivoting lever 4a is rotatably journaled about a pivot axis 4b. A roller element 3 is present, arranged on a second pivoting lever 4c. The second pivoting lever 4c is rotatably journaled about a pivot axis 4d. The roller element 3 is journaled so as to be rotatable about an axis 3a over a certain range in the direction of an arrow A, a spring prestress being applied in the direction of a contact edge 6 against the direction of the arrow A by means of a torsion spring which is not shown in any detail.

The transport wheel 2 and the roller element 3 have respective grooves into which the plate edge of the information plate can be pressed. The first pivoting lever 4a and the second pivoting lever 4c are coupled to one another by means of a lever mechanism, which is not shown in any detail, or are pretensioned with respect to one another by spring force.

Such a loading mechanism is described in detail in U.S. Pat. No. 6,463,025 B1, which is expressly deemed to be incorporated into the disclosure of the present application.

To load the information plate 1, the transport wheel 2 is driven into rotation in anti-clockwise direction by a drive motor 9. The rotating transport wheel 2 then exerts a tangential force on the edge of the information plate 1, as a result of which the information plate 1 is transported in the direction of an arrow B so as to be loaded into a loading device, while being supported between the roller element 3 and the transport wheel 2. The pivoting lever 4a is pivoted about the pivot axis 4b and the pivoting lever 4c about the pivot axis 4d. The transport wheel 2 will rotate in clockwise direction for the purpose of unloading, and the information plate 2 is transported against the loading direction B then.

A scanning lever 5 is provided for detecting the position of the information plate 1, which lever is situated above the pivoting lever 4c and is also rotatably journaled about the pivot axis 4d, while being prestressed by spring force in the direction of the information plate 1. The scanning lever 5 has a scanning edge 5a which is pressed against the plate edge of the information plate 1. The scanning lever 5 is accordingly pivoted by the plate edge of the information plate 1 during loading and unloading of the information plate 1. The scanning lever 5 is coupled to a variable resistor 6 at its end opposed to the scanning edge 5a. The variable resistor 6 changes its electrical resistance in dependence on the position of the scanning lever 5 and the information plate 1. This change in resistance is transmitted to a control unit for monitoring and controlling the loading and unloading process of the information plate 1.

The scanning lever 5 may alternatively be journaled in a different manner, for example about a pivot axis other than that of the lever 4c. In addition, the scanning lever may be so journaled that not only rotary movements, but also translatory movements of the scanning lever are possible.

To start the loading process, the user must bring the information plate 1 into the ejection position depicted in the FIGURE and push the information plate some distance in the loading direction B. When the information plate 1 is being inserted in the loading direction B, the roller element 3 will rotate in the direction of the arrow A against the spring force of the torsion spring. To keep the forces to be exerted by the user small here, the torsion spring force is chosen to be very small. As a result, the information plate can be inserted into the device over a short insertion distance while lightly rolling over the roller element. The scanning lever 5 scans the position of the information plate 1 during this and is pivoted, whereby the variable resistor 6 changes its resistance, the drive motor 9 is started for driving the transport wheel 2, and the information plate is automatically pulled inwards by the loading mechanism. Such a construction has the advantage that the user must overcome only the small force of the torsion spring prestressing the roller element 3 and not the substantially greater spring force by means of which the pivoting arms 4a and 4c are usually prestressed with reference to one another. This is in particular also advantageous for the so-called push-back function by means of which the user can return an ejected information plate immediately back into the device. Owing to the small prestress force of the rotary roller element 3, a slight tapping in the loading direction B is sufficient for this.

The roller element 3 is pressed against the contact edge 8 against the spring force of the torsion spring both during the further transport of the information plate 1 in the loading direction B and during the transport against the loading direction B (unloading).

The invention claimed is:

1. A method, comprising:
   receiving an information plate at a roller element, the information plate rolling over the roller element;
   detecting a position of the information plate using a scanning lever, the scanning lever having a scanning edge pressed against an edge of the information plate;
   driving a transport wheel into rotation based on the detected position of the information plate;
   exerting a tangential force on the edge of the information plate using the transport wheel; and
   transporting the information plate into a loading device, the information plate supported by the transport wheel and the roller element.

2. The method of claim 1, wherein:
   the transport wheel and the roller element are located on separate pivoting arms; and
   the scanning lever and one of the pivoting arms are journaled around a common pivot axis.

3. The method of claim 1, wherein detecting the position of the information plate using the scanning lever comprises changing a resistance of a variable resistor based on the position of the information plate.

4. The method of claim 3, further comprising:
   receiving the changes in resistance at a control unit; and
   controlling loading and unloading of the information plate using the received changes in resistance.

5. The method of claim 1, further comprising prestressing the scanning lever against the information plate using spring force.

6. The method of claim 5, wherein the spring force is provided by a torsion spring.

7. The method of claim 1, wherein the information plate comprises one of a CD, a CD-ROM, and a DVD.

* * * * *